(12) United States Patent
Marupaduga

(10) Patent No.: US 11,723,099 B1
(45) Date of Patent: *Aug. 8, 2023

(54) USE OF FREQUENCY BAND COMPARISON AS BASIS TO CONTROL CONFIGURATION OF DUAL-CONNECTIVITY SERVICE

(71) Applicant: Sprint Spectrum LLC, Bellevue, WA (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,050

(22) Filed: May 25, 2022

Related U.S. Application Data

(63) Continuation of application No. 16/842,465, filed on Apr. 7, 2020, now Pat. No. 11,375,566.

(51) Int. Cl.
  *H04W 76/16* (2018.01)
  *H04W 48/06* (2009.01)
  *H04W 8/24* (2009.01)
  *H04W 48/20* (2009.01)

(52) U.S. Cl.
  CPC ............. *H04W 76/16* (2018.02); *H04W 8/24* (2013.01); *H04W 48/06* (2013.01); *H04W 48/20* (2013.01)

(58) Field of Classification Search
  CPC .......................... H04W 52/0212; H04W 88/06
  USPC ...................... 370/328, 331, 252; 455/456.1
  See application file for complete search history.

(56) References Cited

U.S. PATENT DOCUMENTS

| | | | |
|---|---|---|---|
| 10,945,260 B2* | 3/2021 | Mestanov | ......... H04W 36/0066 |
| 2014/0335882 A1 | 11/2014 | Lee et al. | |
| 2016/0029376 A1 | 1/2016 | Fukuta et al. | |
| 2016/0157155 A1 | 6/2016 | Chiba et al. | |
| 2016/0270139 A1* | 9/2016 | Rahman | ................. H04W 72/27 |
| 2018/0279218 A1 | 9/2018 | Park et al. | |
| 2018/0376401 A1 | 12/2018 | Karimli et al. | |
| 2019/0037417 A1* | 1/2019 | Lei | ...................... H04W 72/542 |
| 2019/0037626 A1 | 1/2019 | Kronestedt et al. | |
| 2020/0092879 A1 | 3/2020 | Wu | |
| 2020/0145888 A1 | 5/2020 | Paladugu et al. | |

(Continued)

FOREIGN PATENT DOCUMENTS

WO   WO 2019/170209   9/2019

OTHER PUBLICATIONS

Office Action from U.S. Appl. No. 16/869,970, dated Aug. 18, 2021.

*Primary Examiner* — Kiet M Doan
(74) *Attorney, Agent, or Firm* — McDonnell Boehnen Hulbert & Berghoff LLP

(57) ABSTRACT

When a first access node is considering setup of dual-connectivity service for a UE, the first access node could determine that the UE supports dual-band dual-connectivity service in which the UE would be served concurrently by a first access node, under a first radio access technology (RAT) over a first connection on a first frequency band and by a second access node, under a second RAT over a second connection on a second frequency band. To help optimize service when faced with the ability to set up either single-band dual-connectivity for the UE or dual-band dual-connectivity for the UE, the first access node will set up single-band dual connectivity for the UE.

20 Claims, 4 Drawing Sheets

(56) References Cited

U.S. PATENT DOCUMENTS

2020/0344839 A1 10/2020 Kwok et al.
2021/0076441 A1 3/2021 Guha et al.

\* cited by examiner

WHILE A FIRST ACCESS NODE IS SERVING A UE OVER A FIRST CONNECTION ON A FREQUENCY BAND, THE FIRST ACCESS NODE DETERMINES THAT THE UE SUPPORTS BOTH (i) SINGLE-BAND DUAL-CONNECTIVITY IN WHICH THE SECOND CONNECTION WITH THE SECOND ACCESS NODE WOULD BE ON THE SAME FREQUENCY BAND AS THE FIRST CONNECTION WITH THE FIRST ACCESS NODE AND (ii) DUAL-BAND DUAL-CONNECTIVITY IN WHICH THE SECOND CONNECTION WITH THE SECOND ACCESS NODE WOULD BE ON A DIFFERENT FREQUENCY BAND THAN THE FIRST CONNECTION WITH THE FIRST ACCESS NODE ⟩ 38

BASED AT LEAST ON THE DETERMINING, THE FIRST ACCESS NODE DECIDES TO CONFIGURE SINGLE-BAND DUAL-CONNECTIVITY FOR THE UE AND ACCORDINGLY CONFIGURES THE SINGLE-BAND DUAL-CONNECTIVITY FOR THE UE ⟩ 40

Fig. 2

USE OF FREQUENCY BAND COMPARISON AS BASIS TO CONTROL CONFIGURATION OF DUAL-CONNECTIVITY SERVICE

REFERENCE TO RELATED APPLICATION

This is a continuation of U.S. patent application Ser. No. 16/842,465, filed Apr. 7, 2020, the entirety of which is hereby incorporated by reference.

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. (In practice, an access node might provide multiple cells, each on a different respective carrier. But for simplicity, each cell in that scenario could be considered to be provided by a different respective access node.)

Further, each such carrier could be defined within an industry standard frequency band, by its frequency channel(s) being defined within the frequency band. Examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, (iii) Band 71, which supports FDD carriers and extends from 663 MHz to 698 MHz on the uplink and 617 MHz to 652 MHz on the downlink, (iv) Band 41, which supports TDD carriers and extends from 2496 MHz to 2690 MHz, (v) Band N260, which supports TDD carriers and extends from 27 GHz to 40 GHz, and (vi) Band N261, which supports TDD carriers and extends from 27.5 GHz to 28.35 GHz.

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes.

On the downlink, for instance, certain resource elements in each downlink subframe could be generally reserved to define a downlink control channel for carrying control signaling such as PRB-allocation directives and the like to served UEs, and other resource elements in each downlink subframe could be generally reserved to define a downlink shared channel in which the PRBs noted above can be allocated to carry data from the access node to UEs. Further, certain resource elements in designated downlink subframes could be reserved to carry synchronization signals that UEs could detect as an indication of coverage, other resource elements distributed in a defined pattern throughout each downlink subframe could be reserved to carry a reference signal that UEs could measure in order to determine coverage strength.

And on the uplink, certain resource elements in each uplink subframe could be generally reserved to define an uplink control channel for carrying control signaling such as scheduling requests from UEs to the access node, and other resource elements in each uplink subframe could be generally reserved to define an uplink shared channel in which the PRBs noted above can be allocated to carry data from UEs to the access node. Further, certain resource elements on the uplink could be specially reserved to carry other uplink signals, such as random access signals, sounding reference signals, and the like.

Other air interface configurations are possible as well.

OVERVIEW

When a UE enters into coverage of an example network, the UE could detect threshold strong coverage of an access node in a particular cell (e.g., a threshold strong reference signal broadcast by the access node on that carrier of that cell) and could then engage in random-access and connection signaling, such as Radio Resource Control (RRC) signaling, to establish an air-interface connection (e.g., RRC connection) through which the access node will then serve the UE in that cell.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in the downlink control channel of that subframe a Downlink Control Information (DCI) message that designates the allocated PRBs, and the access node could accordingly transmit the transport block to the UE in those designated PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the access node a positive acknowledgement (ACK) control message, and the access node could then proceed with transmission of a next transport block (if any) to the UE. Whereas, if the UE did not receive the transmission or determined that the CRC did not match and thus that there was an error in the received transport block, then the UE could transmit to the access node a negative acknowledgement (NACK), in response to which the access node could attempt the transmission again.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE, in the downlink channel of a preceding subframe, a DCI message that designates those upcoming PRBs. And the UE could then accordingly transmit the transport block to the access node in the designated PRBs.

As with downlink transmission, for each transport block that the UE transmits to the access node, the access node could determine if the transport block arrived successfully, based on a CRC analysis for instance. And if the access node received the transmission successfully, then the access node could transmit to the UE an ACK and could schedule a next uplink transmission from the UE. Whereas, if the access node did not receive the transmission successfully, then the access node could transmit to the UE a NACK, and the UE could attempt retransmission to the access node.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT ("first-RAT access node") and a second access node that provides service according to a second RAT ("second-RAT access node"), and a UE positioned within coverage of the cell site could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

For instance, the MN could direct the UE to scan for secondary coverage under the second RAT, possibly identifying one or more SNs and associated carriers for which the UE should scan, and could receive in response from the UE a report that the UE detected threshold strong coverage of one or more SNs. And the MN could then coordinate setup of dual-connectivity service with the UE being served by the MN and such an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

Further, various split-bearer arrangements may be possible.

In one implementation, the split bearer could be established at the gateway, with one bearer leg extending between the gateway and the MN and another bearer leg extending between the gateway and the SN. For instance, while maintaining the UE's access bearer between the MN and the gateway, the core-network controller could coordinate setup of a secondary access bearer between the SN and the gateway. With this arrangement, communications between the UE and the MN could flow over the access bearer between the MN and the gateway, and communications between the UE and the SN could flow over the access bearer between the SN and the gateway.

In another implementation, the split bearer could be established at the SN, with the UE's access bearer extending between the gateway and the SN and a leg of the bearer extending further between the SN and the MN. For instance, the core-network controller could coordinate transfer of the UE's access bearer from being between the gateway and the MN to instead being between the gateway and the SN, and the MN and SN could coordinate setup of the bearer leg between the MN and the SN. With this arrangement, communications between the SN and the UE would flow over the access bearer between the SN and the gateway, and communications between the MN and the UE would flow between the MN and the SN and likewise over the access bearer between the SN and the gateway.

And in yet another implementation, the split bearer could be established at the MN, with the UE's access bearer still extending between the gateway and the MN, and with a leg of the bearer extending between the MN and the SN. For instance, the MN could maintain the access bearer between the MN and the gateway, and the MN and SN could coordinate setup of the bearer leg between the MN and the SN. With this arrangement, communications between the MN and the UE could flow over the access bearer between the MN and the gateway, and communications between the SN and the UE could flow between the SN and the MN and likewise over the access bearer between the MN and the gateway.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the one of the access nodes providing for uplink scheduled data communication.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just one of the access nodes.

One technical issue that can arise in dual-connectivity service is that a UE's serving MN and SN might operate on different frequency bands than each other. Such a dual-band dual-connectivity arrangement could create various problems.

For one, if the MN and SN of a common cell site operate on different frequency bands than each other, they may provide different effective distances of coverage than each other, so that a UE served concurrently by both access nodes could be positioned at a location where the UE is in relatively good coverage of one of the access nodes but in relatively poor coverage of the other of the access nodes. In general a cell operating on higher frequency band would have greater path loss and thus shorter distance of coverage than a cell operating on a lower frequency band. Therefore, when a UE is served with dual-band dual-connectivity and is positioned sufficiently far from the MN and SN, the UE's transmissions to one of the access nodes may be more likely to succeed, while the UE's transmissions to the other access node may be more likely to fail—which could lead to retransmissions and other problems.

Further, in some dual-connectivity implementations, inter-access-node communications between access nodes that operate on different frequency bands than each other may have higher latency than inter-access-node communications between access nodes that operate on the same frequency band as each other. One reason for this could be that a cell site might have separate baseband units, associated cabinets, or other such equipment respectively per frequency band, so that communications between access nodes operating on different frequency bands may span a longer and/or more complex path than communications between access nodes operating on the same frequency band as each other.

The issue of dual-band dual connectivity could arise specifically for a UE only if the UE supports dual-band dual-connectivity operation, i.e., if the UE supports being served by an MN and an SN on different frequency bands than each other, and only if the MN configures dual-band dual-connectivity service for the UE.

Given this, the present disclosure provides an improvement to help optimize service of a UE that supports dual-band dual-connectivity service.

In accordance with the disclosure, when an MN is considering setup of dual-connectivity service for a UE that supports dual-band dual-connectivity service, and the MN faces a choice which of multiple SNs to use as an SN for the UE's dual connectivity service, the MN will select an SN based on the SN operating on the same frequency band as the MN.

For instance, the MN could first determine from UE-capability data that the UE supports dual-band dual-connectivity service. And that determination could thus establish that the UE could be served with either single-band dual-connectivity service (with the MN and SN operating on the same frequency band as each other) or dual-band dual-connectivity service (with the MN and SN operating on different frequency bands than each other). Given these possibilities, i.e., responsive to the determination, the MN could then proceed to select an SN based at least on the selected SN operating on the same frequency band as the MN. For example, responsive to determining that the UE supports dual-band dual-connectivity service, and given a choice between at least a first SN that operates on the same frequency band as the MN and a second SN that operates on a different frequency band than the MN, the MN could decide to select the first SN based at least on the first SN operating on the same frequency band as the MN, and the MN could decide to not select the second SN based at least on the second SN operating on a different frequency band than the MN. The MN could then configure dual-connectivity service for the UE in accordance with the decision.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is a flow chart depicting an example method in accordance with the present disclosure.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
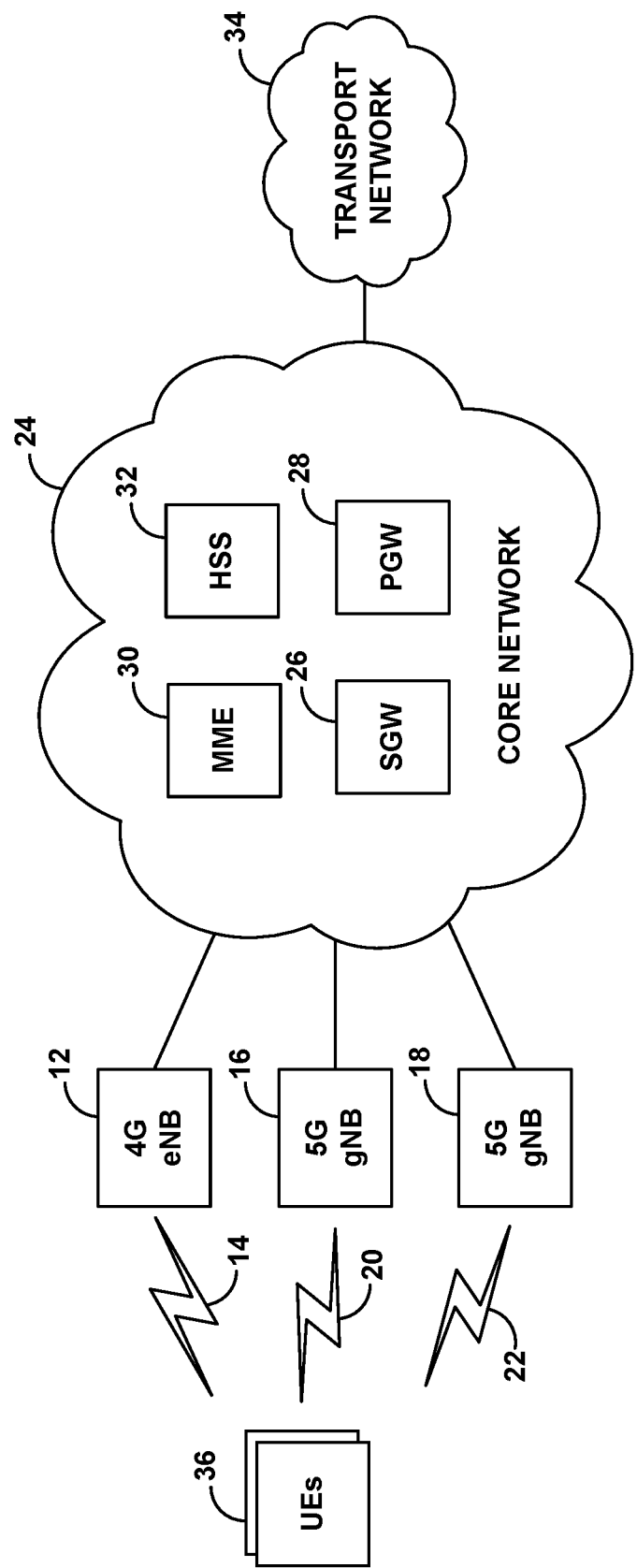
FIG. 1 is a simplified block diagram of an example network arrangement in which features of the present disclosure can be implemented.

FIG. 1 depicts an example network having a 4G eNB 12 that is configured to provide 4G service on a representative 4G carrier 14, and at least two example 5G gNBs 16, 18, configured to provide 5G service on representative 5G carriers 20, 22. Each of these access nodes could be a macro access node of the type configured to provide a wide range of coverage or could take other forms, such as a small cell access node, a repeater, a femtocell access node, or the like, which might be configured to provide a smaller range of coverage, among other possibilities. Further, these access nodes could be collocated with each other and could provide coverage in largely the same direction as each other, to define an area in which UEs can engage in both 4G service provided by the 4G eNB 12 and 5G service provided by a 5G gNB 16, 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier. And each such carrier respectively could be defined within an industry standard frequency band such as one of those noted above. Without limitation, for instance, the 4G carrier 14 on which the 4G eNB 12 operates could be defined in band 25, the 5G carrier 20 on which 5G gNB 16 operates could also be defined in band 25, and the 5G carrier 22 on which 5G gNB 18 operates could be defined in band 41.

Further, the air interface on each of these carriers could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the example 4G and 5G access nodes in the example arrangement are each connected with a core network 24, such as an Evolved Packet Core (EPC) network or Next Generation Core (NGC) network. In the example shown, the core network includes a serving gateway (SGW) 26, a packet data network gateway (PGW) 28, a mobility management entity (MME) 30, and a home subscriber server (HSS) 32, although other arrangements are possible as well.

In an example implementation, without limitation, each access node could have an interface with the SGW, the SGW could have an interface with the PGW, and the PGW could provide connectivity with a transport network 34. Further, each access node could have an interface with the MME, and the MME could have an interface with the SGW, so that the MME could coordinate setup of bearers for UEs to enable the UEs to engage in packet-data communication via 4G and 5G. Alternatively, just the 4G eNB might have an interface with the MME and may function as an anchor for signaling with the MME both for 4G service and for 5G and EN-DC service.

Still further, the HSS could store UE profile records, which could specify service-subscription plans, UE configurations, and/or other such UE capability information, such as whether a UE is EN-DC capable, and if so whether the UE supports dual-band EN-DC service or just single-band EN-DC service. Whether a UE supports dual-band EN-DC service or rather just single-band EN-DC service might be a subscription issue and/or more might depend on hardware and/or software configuration of the UE, such as whether the UE is equipped with RF circuitry and logic that enables the UE to communicate concurrently on two different frequency bands for instance.

FIG. 1 further depicts various example UEs 36 that may from time to time be within coverage of the 4G and 5G access nodes and may from time to time be served by the access nodes. In a representative implementation, each such UE may be 4G and 5G capable, including both a 4G radio and associated equipment and logic that enables the UE to connect with and be served by a 4G eNB, and a 5G radio and associated equipment and logic that enables the UE to connect with and be served by a 5G gNB.

Further, each such UE may support EN-DC service, so the UE would support single-band EN-DC service, and each UE may or may not also support dual-band EN-DC service. For instance, a given UE may support dual-band EN-DC service, so the UE would support both single-band EN-DC service and dual-band EN-DC service, whereas another UE may not support dual-band EN-DC service, so the UE would support single-band EN-DC service but not dual-band EN-DC service.

In line with the discussion above, upon entering into coverage of the access nodes as shown, a representative such UE 36 could initially scan for 4G coverage and discover threshold strong coverage of 4G eNB 12 on 4G carrier 14. The UE could then engage in RRC signaling with that 4G eNB to establish a 4G connection on the 4G carrier as discussed above. And if appropriate, the UE could engage in attach signaling with the MME through the 4G connection, and the MME could coordinate setup of a bearer for the UE. Further, the 4G eNB could then select a 5G gNB to provide secondary connectivity for the UE, and the 4G eNB could coordinate setup of EN-DC service for the UE, including setup for the UE of a 5G connection with the selected 5G gNB on a 5G carrier, and setup of a split bearer as discussed above. The 4G eNB and 5G gNB could then each serve the UE with packet-data communications over their respective connections with the UE, in the manner discussed above.

In relation to this attachment process, the 4G eNB could also transmit to the UE an RRC message carrying a UE-capability enquiry, and the UE could respond to the 4G eNB with a "UE capability information" information element (IE), which could indicate that the UE is EN-DC capable and, if so, could indicate whether the UE supports dual-band EN-DC. Alternatively, the 4G eNB could receive such capability information from the MME, which could obtain the information from the HSS. The 4G eNB could then store this UE capability data in a context record for reference while serving the UE.

As further discussed above, if the UE at issue supports dual-band EN-DC service, the 4G eNB could take into account the respective frequency band on which each of one or more candidate 5G gNBs operates, in order for the 4G eNB to decide which of multiple 5G gNBs to use as an SN for the UE's EN-DC service.

In a representative implementation, the 4G eNB could first identify a candidate set of one or more 5G gNBs available for possible use in EN-DC service of the UE. The 4G eNB could be pre-provisioned with data indicating this candidate set, perhaps one or more 5G gNBs collocated with the 4G eNB. Or the 4G eNB could direct the UE to scan for 5G coverage and could receive in response from the UE a report indicating that the UE has detected threshold strong coverage of each of one or more such 5G gNBs defining the candidate set. In the arrangement of FIG. 1, the candidate set might be 5G gNBs 16 and 18. Alternatively, the candidate set might be just a single 5G gNB. Or in another arrangement, the candidate set may include one or more other 5G gNBs, perhaps more than two.

In practice, the 4G eNB might establish this candidate set of 5G gNBs in the first place based on a consideration whether the UE supports dual-band EN-DC and, if so, whether each 5G gNB of the candidate set operates on the same frequency band as the 4G eNB. For instance, the 4G eNB could first refer to the UE's capability data and determine from the capability data that the UE supports dual-band EN-DC. Given this, the 4G eNB could thus include in the candidate set both one or more 5G gNBs that operate on the same frequency band as the 4G eNB and one or more 5G gNBs that operate on a different frequency band than the 4G eNB. But as presently contemplated, to help avoid technical issues as noted above, the 4G eNB could limit the candidate set to be just one or more 5G gNBs that operate on the same frequency band as the 4G eNB.

With the example carriers noted above, for instance, the 4G eNB might determine that 5G gNB 16 operates on the same frequency band as the 4G eNB, and, based at least on this determination, the 4G eNB might therefore include 5G gNB 16 in the candidate set for the UE. Whereas, the 4G eNB might determine that 5G gNB 18 operates on a different frequency band than the 4G eNB, and, based at least on this determination, the 4G eNB might therefore exclude the 5G gNB 18 from the candidate set for the UE. With this example, without limitation, the resulting candidate set for the UE may therefore be just 5G gNB 16. (Though in another implementation, the resulting candidate set might be more than one 5G gNB.) And the 4G eNB could thus direct the UE to scan for coverage of 5G gNB 16 (on carrier 20), and if the UE reports being in threshold strong coverage of that 5G gNB, the 4G eNB could then proceed to configure EN-DC service for the UE with 5G gNB 16 as the UE's SN.

Alternatively, the 4G eNB might establish the candidate set of 5G gNBs in another manner, such as based on the UE scanning and reporting being in threshold strong coverage of both 5G gNB 16 (on carrier 20) and 5G gNB 18 (on carrier 22). In this example too, the 4G eNB might determine from the UE'S capability data that the UE supports dual-band EN-DC. And given this, the 4G eNB might then determine which of the 5G gNBs of the candidate set operates on the same frequency band as the 4G eNB, and based at least on that determination may select one of the candidate 5G gNBs to be the UE's SN for EN-DC service. Namely, with the example carriers noted above, the 4G eNB could decide to select 5G gNB 16 to be the UE's SN for EN-DC service, with the decision being based at least on 5G gNB 16 operating on the same frequency band as the 4G eNB. And the 4G eNB could decide to not select 5G gNB 18 to be the UE's SN for EN-DC service, with the decision being based at least on 5G gNB 18 operating on a different frequency band than the 4G eNB. Here too, the 4G eNB could then proceed to configure EN-DC service for the UE with 5G gNB 16 as the UE's SN.

Note further that the 4G eNB could take into consideration additional factors as well in deciding to select a given 5G gNB to be the UE's SN, and/or in deciding to not select another given 5G gNB to be the UE's SN. As one example, for instance, the 4G eNB could take into consideration the load of each of various 5G gNBs, such as the PRB utilization of the 5G gNB and/or control channel load (e.g., control-channel resource utilization) of the 5G gNB. And based further on this load, the 4G eNB could decide to select a given 5G gNB or to not select a given 5G gNB. For instance, the decision of the 4G eNB to not select a given 5G gNB to be the dual-band-dual-connectivity-capable UE's SN for dual-connectivity service could be based on both that 5G gNB operating on a different frequency band than the 4G eNB and based on the control channel load of the 5G gNB being at least predefined threshold high. Other factors could be considered as well.

FIG. 2 is next a flow chart depicting an example method for controlling configuration of dual-connectivity service for a UE, the dual-connectivity service including the UE being served concurrently by a first access node over a first connection according to a first RAT and by a second access node over a second connection according to a second RAT, where the first access node operates on a frequency band and provides the first connection on the frequency band. In an example implementation, the first RAT could be 4G LTE, the second RAT could be 5G NR, and the dual-connectivity service could be EN-DC. Further, the method could be carried out in a wireless communication system such as that shown in FIG. 1, including a first access node configured to provide service according to the first RAT and multiple second access nodes each configured to provide service according to the second RAT.

As shown in FIG. 2, at block 38, the method includes, while the first access node is serving the UE over the first connection on the frequency band, the first access node determining that the UE supports both (i) single-band dual-connectivity in which the second connection with the second access node would be on the same frequency band as the first connection with the first access node and (ii) dual-band dual-connectivity in which the second connection with the second access node would be on a different frequency band than the first connection with the first access node. And at block 40, the method includes, based at least on the determining, the first access node deciding to configure single-band dual-connectivity for the UE and accordingly configuring the single-band dual-connectivity for the UE.

In line with the discussion above, in this method, the act of determining that the UE supports both single-band dual-connectivity and dual-band dual-connectivity could involve determining that the UE supports dual-band dual-connectivity, in a situation where support for dual-band dual-connectivity implicitly includes support for single-band dual-connectivity as well. Further, the act of determining that the UE supports both single-band dual-connectivity and dual-band dual-connectivity could be based on reference to UE capability data.

In addition, as discussed above, the act of the first access node deciding to configure the single-band dual-connectivity for the UE could involve, faced with a choice of multiple candidate access nodes to use as the second access node for the dual-connectivity service for the UE (e.g., multiple candidate access nodes collocated with the first access node), (i) determining that a first one of the candidate access nodes operates on the same frequency band as the first access node and (ii) based at least on the determining that the first candidate access node operates on the same frequency band as the first access node, deciding to use the first candidate access node as the second access node for the dual-connectivity service for the UE.

Further, as discussed above, the act of the first access node deciding to configure the single-band dual-connectivity for the UE could involve, faced with the choice of the multiple candidate access nodes to use as the second access node for the dual-connectivity service for the UE, (i) determining that a second one of the candidate access nodes operates on a different frequency band than the first access node and (ii) based at least on the determining that the second candidate access node operates on the different frequency band than the first access node, deciding to not use the second candidate access node as the second access node for the dual-connectivity service for the UE. Further, the act of deciding to not use a given candidate access node as the second access node for the dual-connectivity service for the UE could be additionally based on an evaluation of load of the given candidate access node, such as based on control channel load of the candidate access node.

In addition, as discussed above, the method could also involve the first access node establishing a set of candidate access nodes based on each candidate access node of the set operating on the same frequency band as the first access node. And in that case, the act of configuring the single-band dual-connectivity for the UE could involve (i) selecting one of the candidate access nodes from the established set to be the second access node for the dual-connectivity service for the UE and (i) configuring the dual-connectivity service for the UE with the selected candidate access node as the second access node for the dual-connectivity service.

Further, the act of configuring the single-band dual-connectivity for the UE could involve (i) selecting an access node as the second access node based on the selected access node operating on the same frequency band as the first access node, (ii) engaging in signaling to configure the second connection between the UE and the selected second access node, and (iii) engaging in signaling to establish for the UE a split bearer so that the first access node and second access node can both serve the UE with data communications.

Figure 3:
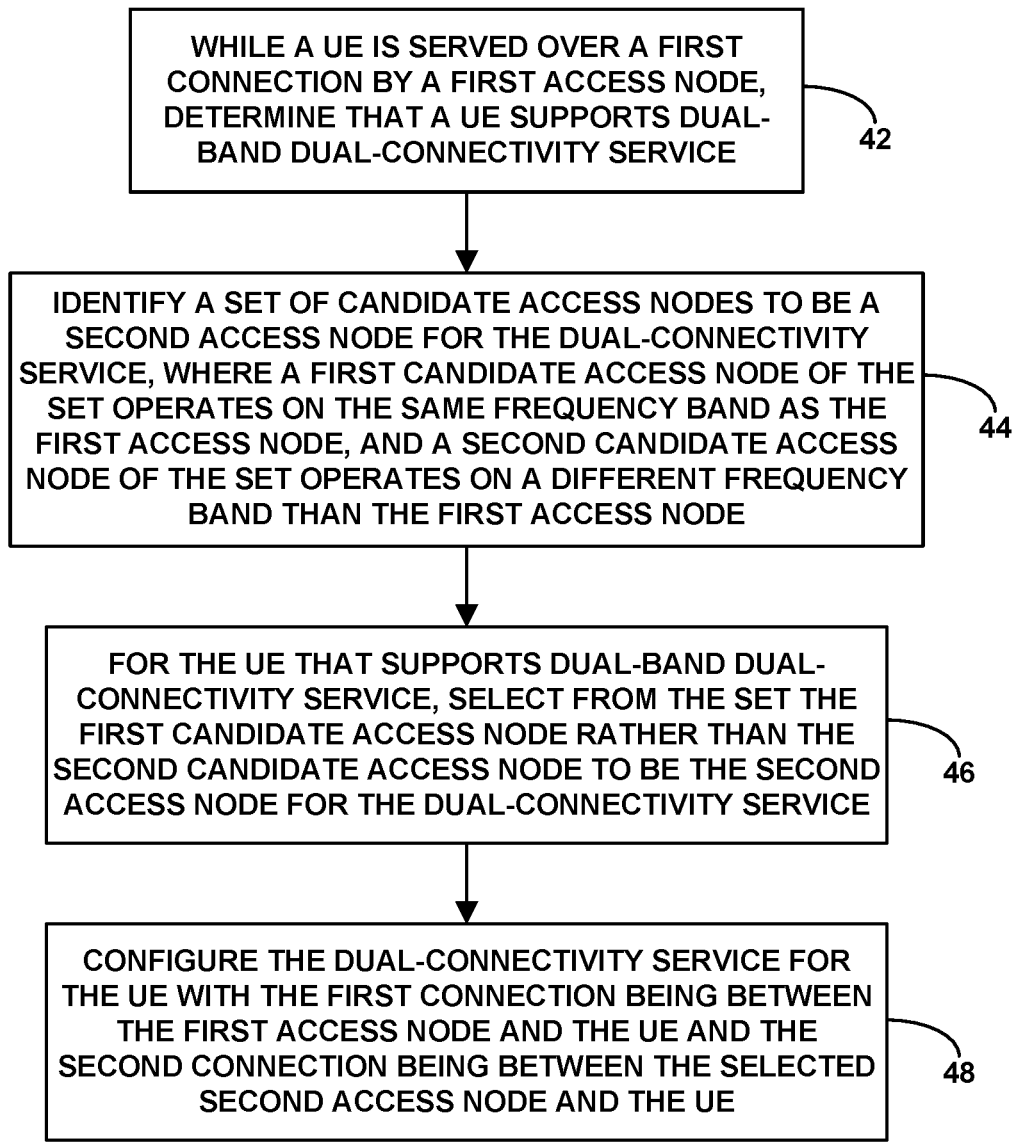
FIG. 3 is another flow chart depicting an example method in accordance with the present disclosure.

FIG. 3 is next another flow chart depicting an example method for controlling configuration of dual-connectivity service for a UE, the dual-connectivity service including the UE being served concurrently over a first connection according to a first RAT and over a second connection according to a second RAT. This method could be implemented in a context similar to that discussed above for instance, by or on behalf of the first access node for example.

As shown in FIG. 3, at block 42, the method includes determining that the UE supports dual-band dual-connectivity service. At block 44, the method further includes identifying a set of candidate access nodes to be the second access node for the dual-connectivity service, where a first candidate access node of the set operates on the same frequency band as the first access node, and a second candidate access node of the set operates on a different frequency band than the first access node. Still further, at block 46, the method includes, for the UE that supports dual-band dual-connectivity service, selecting from the set the first candidate access node rather than the second candidate access node to be the second access node for the dual-connectivity service. And at block 48, the method includes configuring the dual-connectivity service for the UE with the first connection being between the first access node and the UE and the second connection being between the selected second access node and the UE.

Various other features discussed herein can be implemented in this context as well, and vice versa.

For instance, the act of determining that the UE supports dual-band dual-connectivity could be based on reference to UE capability data. And the act of configuring the dual-connectivity for the UE could involve (i) selecting one of the candidate access nodes from the established set to be the second access node for the dual-connectivity service for the UE and (i) configuring the dual-connectivity service for the UE with the selected candidate access node as the second access node for the dual-connectivity service.

Figure 4:
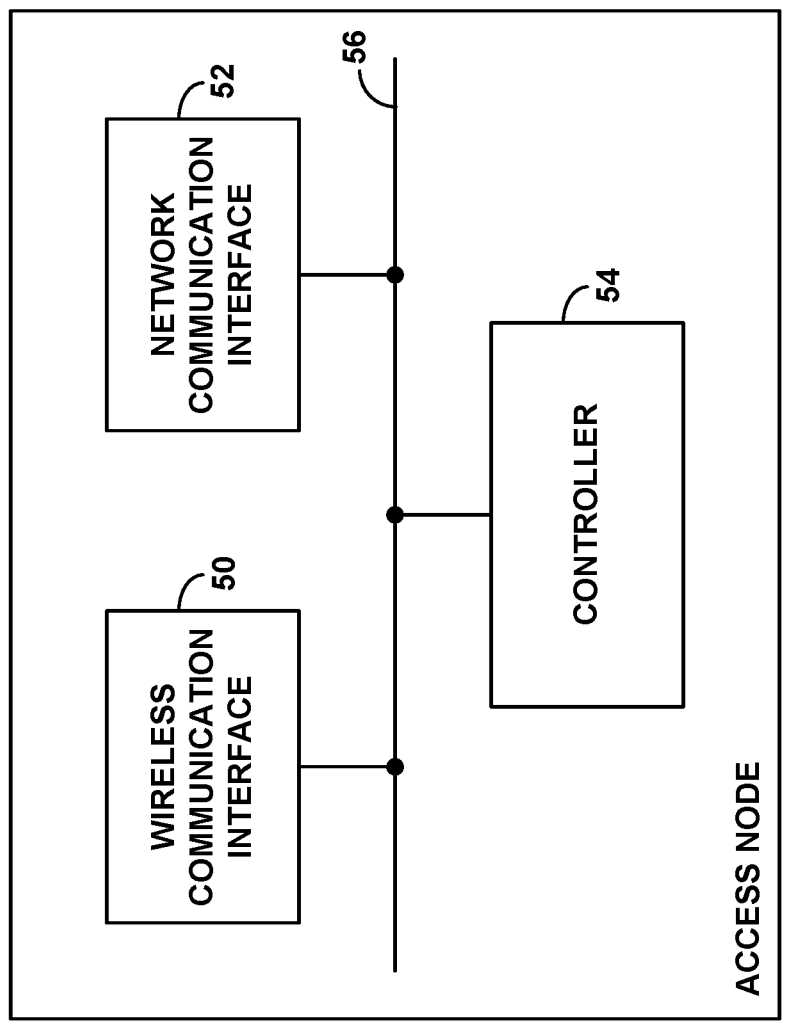
FIG. 4 is a simplified block diagram of an example access node operable in accordance with the present disclosure.

FIG. 4 is next a simplified block diagram depicting an example first access node that could operate in accordance with the present disclosure. As shown, the example first access node includes a wireless communication interface 50, a network communication interface 52, and a controller 54, all of which may be communicatively linked together by a system bus, network, or other connection mechanism 56.

In the context discussed above, this first access node could be configured to engage in air-interface communication and to provide service according to a first RAT through the wireless communication interface 50. Further, the first access node could be provided in a wireless communication system that includes multiple second access nodes each configured to provide service according to a second RAT. As noted above, these access nodes may be collocated.

In this example first access node, the wireless communication interface 50 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the first RAT. And the network communication interface 52 could comprise a wired or wireless interface, such as an Ethernet network communication interface, configured to support communication with other entities, such as with the other access node and various core-network entities.

Further, controller 54 could comprise a processing unit (e.g., one or more general purpose processors and/or specialized processors) programmed to cause the first access node to carry out various operations such as those discussed above. For instance, the controller could comprise non-transitory data storage (e.g., one or more magnetic, optical, or flash storage components) holding program instructions executable by the processing unit to cause the access node to carry out such operations.

In an example implementation, these operations could include (i) determining that the UE supports dual-band dual-connectivity, (ii) for the UE that supports dual-band dual-connectivity (e.g., that the UE supports both dual-band dual-connectivity and single-band dual-connectivity), selecting one of second access nodes from among the plurality of second access nodes, with the selecting being based on the selected second access node operating on a same frequency band as the first access node, and (iii) based on the selecting, configuring the dual-connectivity service for the UE, with the UE having the first connection with the first access node and having the second connection with the selected second access node. Further, the operations could also include deciding to not select another second access node from among the plurality of second access nodes, with the deciding being based on the other second access node operating on a different frequency band than the first access node.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling configuration of dual-connectivity service for a user equipment device (UE), wherein the dual-connectivity service comprises the UE being served concurrently by a first access node over a first connection according to a first radio access technology (RAT) and by a second access node over a second connection according to a second RAT, wherein the first access node operates on a frequency band and provides the first connection on the frequency band, the method comprising:
   determining by the first access node, while the first access node is serving the UE over the first connection on the frequency band, that the UE supports both (i) single-band dual-connectivity in which the second connection with the second access node would be on the same frequency band as the first connection with the first access node and (ii) dual-band dual-connectivity in which the second connection with the second access node would be on a different frequency band than the first connection with the first access node; and
   based at least on the determining, deciding by the first access node to configure the single-band dual-connectivity for the UE and accordingly configuring the single-band dual-connectivity for the UE.

2. The method of claim 1, wherein determining that the UE supports both single-band dual-connectivity and dual-band dual-connectivity comprises determining that the UE supports dual-band dual-connectivity, wherein support for dual-band dual-connectivity includes support for single-band dual-connectivity.

3. The method of claim 1, wherein deciding by the first access node to configure the single-band dual-connectivity for the UE comprises, faced with a choice of multiple candidate access nodes to use as the second access node for the dual-connectivity service for the UE:
   determining that a first one of the candidate access nodes operates on the same frequency band as the first access node; and
   based at least on the determining that the first candidate access node operates on the same frequency band as the first access node, deciding to use the first candidate access node as the second access node for the dual-connectivity service for the UE.

4. The method of claim 3, wherein the multiple candidate access nodes are collocated with the first access node.

5. The method of claim 3, wherein deciding by the first access node to configure the single-band dual-connectivity for the UE comprises, faced with the choice of the multiple candidate access nodes to use as the second access node for the dual-connectivity service for the UE:
   determining that a second one of the candidate access nodes operates on a different frequency band than the first access node; and
   based at least on the determining that the second candidate access node operates on the different frequency band than the first access node, deciding to not use the second candidate access node as the second access node for the dual-connectivity service for the UE.

6. The method of claim 5, where the deciding to not use the second candidate access node as the second access node for the dual-connectivity service for the UE is based additionally on an evaluation of load of the second candidate access node.

7. The method of claim 6, wherein the load is control channel load.

8. The method of claim 1, further comprising:
establishing by the first access node a set of candidate access nodes based on each candidate access node of the set operating on the same frequency band as the first access node,
wherein configuring the single-band dual-connectivity for the UE comprises (i) selecting one of the candidate access nodes from the established set to be the second access node for the dual-connectivity service for the UE and (i) configuring the dual-connectivity service for the UE with the selected candidate access node as the second access node for the dual-connectivity service.

9. The method of claim 1, wherein configuring the single-band dual-connectivity for the UE comprises:
selecting an access node as the second access node based on the selected access node operating on the same frequency band as the first access node;
engaging in signaling to configure the second connection between the UE and the selected second access node; and
engaging in signaling to establish for the UE a split bearer so that the first access node and second access node can both serve the UE with data communications.

10. The method of claim 1, wherein the first RAT is 4G Long Term Evolution (LTE), wherein the second RAT is 5G New Radio (NR), and wherein the dual-connectivity service is EUTRA-NR Dual Connectivity (EN-DC).

11. A first access node comprising:
a wireless communication interface through which to engage in air-interface communication; and
a controller, wherein the controller is configured to cause the first access node to carry out operations for controlling configuration of dual-connectivity service for a user equipment device (UE), wherein the dual-connectivity service comprises the UE being served concurrently by the first access node over a first connection according to a first radio access technology (RAT) and by a second access node over a second connection according to a second RAT, wherein the first access node operates on a frequency band and provides the first connection on the frequency band, the operations comprising:
determining, while the first access node is serving the UE over the first connection on the frequency band, that the UE supports both (i) single-band dual-connectivity in which the second connection with the second access node would be on the same frequency band as the first connection with the first access node and (ii) dual-band dual-connectivity in which the second connection with the second access node would be on a different frequency band than the first connection with the first access node, and
based at least on the determining, deciding to configure the single-band dual-connectivity for the UE and accordingly configuring the single-band dual-connectivity for the UE.

12. The first access node of claim 11, wherein the controller comprises a processor, non-transitory data storage, and program instructions stored in the non-transitory data storage and executable by the processor to cause the first access node to carry out the operations.

13. The first access node of claim 11 wherein determining that the UE supports both single-band dual-connectivity and dual-band dual-connectivity comprises determining that the UE supports dual-band dual-connectivity, wherein support for dual-band dual-connectivity includes support for single-band dual-connectivity.

14. The first access node of claim 11, wherein deciding to configure the single-band dual-connectivity for the UE comprises, faced with a choice of multiple candidate access nodes to use as the second access node for the dual-connectivity service for the UE:
determining that a first one of the candidate access nodes operates on the same frequency band as the first access node; and
based at least on the determining that the first candidate access node operates on the same frequency band as the first access node, deciding to use the first candidate access node as the second access node for the dual-connectivity service for the UE.

15. The first access node of claim 14, wherein the multiple candidate access nodes are collocated with the first access node.

16. The first access node of claim 14, wherein deciding to configure the single-band dual-connectivity for the UE comprises, faced with the choice of the multiple candidate access nodes to use as the second access node for the dual-connectivity service for the UE:
determining that a second one of the candidate access nodes operates on a different frequency band than the first access node; and
based at least on the determining that the second candidate access node operates on the different frequency band than the first access node, deciding to not use the second candidate access node as the second access node for the dual-connectivity service for the UE.

17. The first access node of claim 16, where the deciding to not use the second candidate access node as the second access node for the dual-connectivity service for the UE is based additionally on an evaluation of load of the second candidate access node.

18. The first access node of claim 17, wherein the load is control channel load.

19. The first access node of claim 11, wherein the operations additionally comprise:
establishing a set of candidate access nodes based on each candidate access node of the set operating on the same frequency band as the first access node,
wherein configuring the single-band dual-connectivity for the UE comprises (i) selecting one of the candidate access nodes from the established set to be the second access node for the dual-connectivity service for the UE and (i) configuring the dual-connectivity service for the UE with the selected candidate access node as the second access node for the dual-connectivity service.

20. At least one non-transitory computer readable medium having stored thereon program instructions executable by at least one processing unit to carry out operations for controlling configuration of dual-connectivity service for a user equipment device (UE), wherein the dual-connectivity service comprises the UE being served concurrently by a first access node over a first connection according to a first radio access technology (RAT) and by a second access node over a second connection according to a second RAT, wherein the first access node operates on a frequency band and provides the first connection on the frequency band, the operations comprising:
determining, while the first access node is serving the UE over the first connection on the frequency band, that the UE supports both (i) single-band dual-connectivity in which the second connection with the second access node would be on the same frequency band as the first connection with the first access node and (ii) dual-band dual-connectivity in which the second connection with the second access node would be on a different frequency band than the first connection with the first access node; and based at least on the determining, deciding to configure the single-band dual-connectivity for the UE and accordingly configuring the single-band dual-connectivity for the UE.

* * * * *